(12) United States Patent
Vlantis et al.

(10) Patent No.: US 8,976,762 B2
(45) Date of Patent: *Mar. 10, 2015

(54) RADIO FREQUENCY ARCHITECTURE FOR SPECTRUM ACCESS NETWORKS

(71) Applicant: STMicroelectronics, Inc., Coppell, TX (US)

(72) Inventors: George A. Vlantis, Sunnyvale, CA (US); Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/874,207

(22) Filed: Apr. 30, 2013

(65) Prior Publication Data

US 2013/0244592 A1    Sep. 19, 2013

Related U.S. Application Data

(63) Continuation of application No. 12/035,353, filed on Feb. 21, 2008, now Pat. No. 8,437,314.

(60) Provisional application No. 60/930,077, filed on May 14, 2007, provisional application No. 60/891,122, filed on Feb. 22, 2007.

(51) Int. Cl.
*H04L 12/50* (2006.01)
*H04Q 11/00* (2006.01)
(Continued)

(52) U.S. Cl.
CPC .. *H04B 1/40* (2013.01); *H04B 1/28* (2013.01); *H04W 24/00* (2013.01); *H04W 74/00* (2013.01); *H04W 84/10* (2013.01)

USPC ...... 370/334; 370/338; 375/219; 375/240.06; 375/307; 455/87; 455/193.1; 455/209; 455/315; 455/562.1

(58) Field of Classification Search
USPC ............. 370/334, 338; 375/219, 240.06, 307; 455/87, 193.1, 209, 315, 562.1
See application file for complete search history.

(56) References Cited

U.S. PATENT DOCUMENTS 5,574,413 A    11/1996   Ruelke
5,625,626 A     4/1997   Umekita
(Continued)

OTHER PUBLICATIONS

IEEE Lan Man Standards Committee, Draft Amendment to IEEE Standard for Local and metropolitan area networks Part 16: Air Interface for Fixed and Mobile Broadband Wireless Access Systems Improved Coexistence Mechanisms for License-Exempt Operation, draft, IEEE P802.16h/D1, New York, New York, Oct. 2006, pp. 201.

(Continued)

*Primary Examiner* — Alpus H Hsu
*Assistant Examiner* — Yee Lam
(74) *Attorney, Agent, or Firm* — Allen, Dyer, Doppelt, Milbrath & Gilchrist, P.A.

(57) ABSTRACT

Radio frequency (RF) architectures for spectrum access networks are provided. Embodiments of the invention generally provide a radio frequency (RF) architecture for customer premise equipment (CPE) for use in, for example, IEEE 802.22 wireless regional area networks (WRANs). In some embodiments, the CPE RF architecture includes two receive chains with a directional antenna and an omni-directional antenna, respectively. The CPE RF architecture facilitates opportunistic out-of-band spectrum sensing and WRAN signal receiving that are performed in parallel with data transmission.

2 Claims, 2 Drawing Sheets

(51) Int. Cl.

| | | |
|---|---|---|
| *H04W 4/00* | (2009.01) | |
| *H04B 1/38* | (2006.01) | |
| *H04L 5/16* | (2006.01) | |
| *H04N 7/12* | (2006.01) | |
| *H04N 11/02* | (2006.01) | |
| *H04N 11/04* | (2006.01) | |
| *H03C 3/00* | (2006.01) | |
| *H03K 7/06* | (2006.01) | |
| *H04L 27/12* | (2006.01) | |
| *H04B 1/40* | (2006.01) | |
| *H04B 1/18* | (2006.01) | |
| *H04B 1/16* | (2006.01) | |
| *H04B 1/26* | (2006.01) | |
| *H04B 15/00* | (2006.01) | |
| *H04M 1/00* | (2006.01) | |
| *H04B 1/28* | (2006.01) | |
| *H04W 24/00* | (2009.01) | |
| *H04W 74/00* | (2009.01) | |
| *H04W 84/10* | (2009.01) | |

(56) References Cited

U.S. PATENT DOCUMENTS

| | | | |
|---|---|---|---|
| 5,805,633 | A | 9/1998 | Uddenfeldt |
| 5,862,142 | A | 1/1999 | Takiyasu et al. |
| 6,275,518 | B1 | 8/2001 | Takahashi et al. |
| 6,496,498 | B1 | 12/2002 | Kockmann et al. |
| 6,744,743 | B2 | 6/2004 | Walton et al. |
| 6,763,230 | B2 | 7/2004 | Cheng |
| 6,888,819 | B1 | 5/2005 | Mushkin et al. |
| 7,002,927 | B2 | 2/2006 | Guruprasad |
| 7,024,165 | B2 | 4/2006 | Stepp et al. |
| 7,171,160 | B2 | 1/2007 | Chuah et al. |
| 7,280,836 | B2 | 10/2007 | Fuccello et al. |
| 7,508,781 | B2 | 3/2009 | Liu et al. |
| 7,609,641 | B2 | 10/2009 | Strutt et al. |
| 7,701,910 | B2 | 4/2010 | Yoon et al. |
| 7,710,919 | B2 | 5/2010 | Woo et al. |
| 7,729,696 | B2 | 6/2010 | Harris et al. |
| 7,813,326 | B1 | 10/2010 | Kelm et al. |
| 7,948,930 | B2 | 5/2011 | Rhee |
| 7,983,703 | B2 | 7/2011 | Chu |
| 2002/0009067 | A1 | 1/2002 | Sachs et al. |
| 2002/0052206 | A1 | 5/2002 | Longoni |
| 2002/0062388 | A1 | 5/2002 | Ogier et al. |
| 2003/0013451 | A1 | 1/2003 | Walton |
| 2003/0033394 | A1 | 2/2003 | Stine |
| 2003/0117966 | A1 | 6/2003 | Chen |
| 2004/0072565 | A1 | 4/2004 | Nobukiyo et al. |
| 2004/0142699 | A1 | 7/2004 | Jollota et al. |
| 2004/0266351 | A1 | 12/2004 | Chuah et al. |
| 2004/0266376 | A1 | 12/2004 | Cowley et al. |
| 2005/0157676 | A1 | 7/2005 | Kwak et al. |
| 2005/0226201 | A1 | 10/2005 | McMillin |
| 2005/0239497 | A1 | 10/2005 | Bahl et al. |
| 2005/0245199 | A1 | 11/2005 | Batra et al. |
| 2005/0265283 | A1 | 12/2005 | Qi et al. |
| 2006/0013177 | A1 | 1/2006 | Saito |
| 2006/0142021 | A1 | 6/2006 | Mueckenheim et al. |
| 2006/0199562 | A1 | 9/2006 | Taylor |
| 2007/0091998 | A1 | 4/2007 | Woo et al. |
| 2007/0111734 | A1 | 5/2007 | Beppu et al. |
| 2007/0117517 | A1 | 5/2007 | Hui et al. |
| 2007/0223419 | A1 | 9/2007 | Ji et al. |
| 2007/0243892 | A1 | 10/2007 | Mikami et al. |
| 2007/0248067 | A1 | 10/2007 | Banerjea et al. |
| 2008/0159258 | A1 | 7/2008 | Ji et al. |
| 2008/0165680 | A1 | 7/2008 | Chang |
| 2008/0205352 | A1 | 8/2008 | Chu et al. |
| 2009/0003291 | A1 | 1/2009 | Chu et al. |

OTHER PUBLICATIONS

Freedman, Slave Hierarchy for Better Usage of Regions not Interfered by the Master Subframe, report, IEEE C802.16h-06/102, Broadband Wireless Access Working Group; Nov. 8, 2006, pp. 6.

Chu et al., 6-Address Scheme for TGs Mesh, slides, IEEE 802.11-06/841r5, San Jose, CA, Sep. 19, 2006, pp. 28.

Iwata et al., report, Scalable Routing Strategies for Ad hoc Wireless Networks, Los Angeles, CA, pp. 26.

Hong et al., Scalable Routing Protocols for Mobile Ad Hoc Networks, report, IEEE Jul./Aug. 2002, pp. 11.

Pei et al., Fisheye State Routing: A Routing Scheme for Ad Hoc Wireless Networks, report, IEEE 2000, pp. 5.

Yang et al., Fisheye Zone Routing Protocol for Mobile Ad Hoc Networks, report, Taiwan R.O.C., IEEE 2004, pp. 6.

802.11 Working Group of the LAN/MAN Committee; Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking; Draft document; IEEE P802.11s/D0.03, Aug. 2006, 192 pps, New York, New York.

Woo et al.; Systems, Methods, and Apparatuses for Spectrum-Sensing Cognitive Radios; Provisional U.S. Appl. No. 60/729,036; 43 pps.

Chang, Soo-Young; Analysis of Proposed Sensing Schemes; Report; IEEE P802.22 Wireless RANs; Slides; IEEE 802.22-06/0032r0; Mar. 6, 2006; 82 pps; Sacramento, CA.

Chang, Soo-Young and Zhang, Jianwei; Waveform Modulated WRAN System; Slides; IEEE P802.22 Wireless RANs; IEEE 802. 22-05/0107r3; Jan. 16, 2006; 83 pps; Sacramento, CA.

Chang, Soo-Young; Spectral Correlation Sensing for Detection of Incumbent User Signals for Wireless Rural Area Networks (WRANs) and Other Systems/Applications; Provisional U.S. Appl. No. 60/883,810; Report; 26 pps; CA.

Chu, Liwen; Hu, Wendong; Vlantis, George; Gross, James; Abusubaih, Murad; Willkomm, Daniel and Wolisz, Adam; Dynamic Frequency Hopping Community IEEE P802.22 Wireless RANs; Slides; IEEE 802.22-06/0113r0; Jun. 29, 2006; 61 pps.

RADIO FREQUENCY ARCHITECTURE FOR SPECTRUM ACCESS NETWORKS

The present application is a continuation application of U.S. patent application Ser. No. 12/035,353 filed on Feb. 21, 2008, now U.S. Pat. No. 8,437,314 issued May 7, 2013, and claims the benefit of U.S. Provisional Patent Application No. 60/891,122 filed on Feb. 22, 2007, and U.S. Provisional Patent Application No. 60/930,077 filed on May 14, 2007, which are hereby incorporated by reference in their entirety for all purposes as if fully set forth herein.

BACKGROUND OF THE INVENTION

1. Field of the Invention

The invention relates generally to communication systems and in particular to radio frequency (RF) architectures for spectrum access networks.

2. Discussion of the Related Art

The Institute of Electrical and Electronics Engineers (IEEE) formed the IEEE 802.22 Working Group to develop protocols for an interoperable air interface for use in spectrums allocated to TV broadcast service and to provide wireless services such as broadband access a point-to-multipoint wireless regional area network (WRAN). IEEE 802.22 specifies that a network should operate in a point-to-multipoint basis (P2MP). A system should be formed by base stations (BSs) and customer premise equipment (CPE). The CPEs are attached to the BSs via wireless links in a specified frequency range. Each BS controls the medium access for all CPEs attached to it.

WRAN BSs are capable of performing distributed sensing. In other words, CPEs sense the spectrum and send periodic reports to a base station informing it about what they sense. The BS, with the information gathered, will evaluate if it is necessary to implement a change in the utilized channel or, on the contrary, remain in the same channel to transmit and receive.

There is therefore a need for RF architectures for CPE for use in, for example, IEEE 802.22 WRANs.

SUMMARY OF THE INVENTION

Accordingly, the invention is directed to RF architecture for spectrum access networks that substantially obviates one or more of the problems due to limitations and disadvantages of the related art.

An advantage of the invention is to provide a system capable of receiving outside data from another system, e.g., other BSs and CPEs not subscribed, while transmission/reception on another directional antenna can take place on a BS to which the CPE has subscribed.

Additional features and advantages of the invention will be set forth in the description which follows and, in part, will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the invention as embodied and broadly described, an out-of-band sensing circuit includes a sensing antenna coupled to a pre-selective filter. A low noise amplifier is coupled to the pre-selective filter and a mixer is coupled to the low noise amplifier. A local oscillator and a channel filter are coupled to the mixer. A WRAN synchronization module and a sensing scheme module is coupled to the channel filter.

In another aspect of the invention, a WRAN signal receiving circuit includes an antenna coupled to a RF switch. A pre-selective filter is coupled to the RF switch and a low noise amplifier is coupled to the pre-selective filter. A mixer is coupled to the low noise amplifier, local oscillator, and a channel filter. A WRAN synchronization demodulator decoder is coupled to the channel filter.

In yet another aspect of the invention, a WRAN CPE RF system includes an out-of-band sensing circuit capable of opportunistic out-band spectrum sensing and a WRAN signal receiving circuit capable of performing WRAN signal receiving in parallel with data transmission.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE ILLUSTRATED EMBODIMENTS

Embodiments of the invention generally provide a RF architecture for CPE for use in, for example, IEEE 802.22 WRANs. In some embodiments, the CPE RF architecture includes two receive chains with a directional antenna and an omni-directional antenna, respectively. The CPE RF architecture facilitates opportunistic out-of-band spectrum sensing and WRAN signal receiving that are performed in parallel with data transmission.

In a particular embodiment, the present disclosure provides a WRAN CPE RF architecture. The WRAN CPE RF architecture includes an out-of-band sensing circuit and a WRAN signal receiving circuit coupled to the out-of-band sensing circuit.

Reference will now be made in detail to an embodiment of the present invention, an example of which is illustrated in the accompanying drawings.

Figure 1:
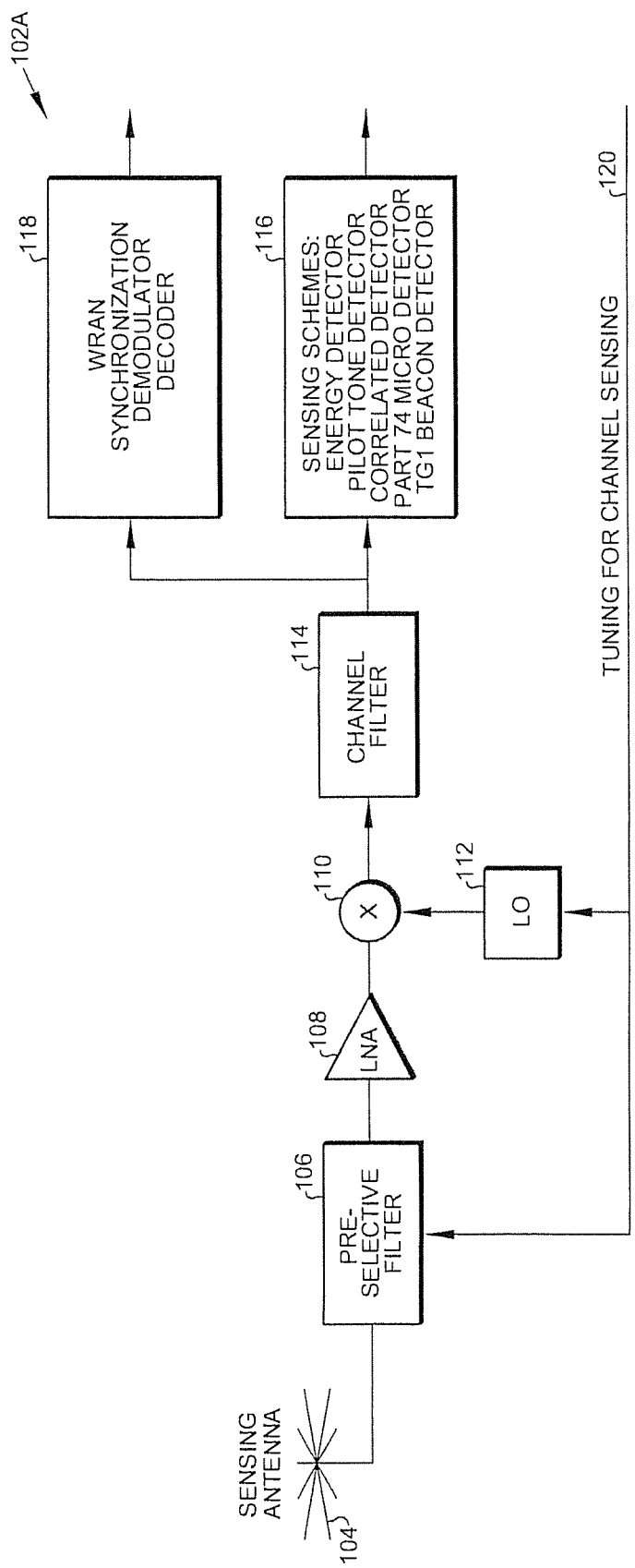
FIG. 1 is a simplified block diagram of a WRAN CPE RF architecture according to one embodiment of the invention.

FIG. 1 is a simplified block diagram of a WRAN CPE RF architecture 100 according to one embodiment of the invention. In this example, the WRAN CPE RF architecture 100 includes an out-of-band sensing circuit 102a. In some embodiments, the out-of-band sensing circuit 102a includes a sensing antenna 104 coupled to a pre-selective filter 106. The pre-selective filter 106 is coupled to a low noise amplifier (LNA) 108. The LNA 108 is coupled to a mixer 110. The mixer 110 is coupled to a local oscillator (LO) 112 and a channel filter 114. The channel filter 114 is coupled to both a sensing scheme module 116 and a WRAN synchronization demodulator decoder 118. The out-of-band sensing circuit 102a also includes a tuning signal 120 for tuning channel sensing.

The sensing scheme module 116 performs a sensing scheme, e.g., sensing function. The sensing function observes the RF spectrum of channels, e.g., television channels, for a set of signal types and reports the results of this observation. The spectrum sensing function may be implemented in both the BS and CPEs. A management frame, e.g., medium access control (MAC) management frame may allow the BS to control operation of the spectrum sensing function within each CPE.

The spectrum sensing function may be performed on any signal type from a variety of different devices. By way of example, the signals may be received from an energy detector, a pilot tone detector, a correlated detector, a Part 44 micro-detector, TGI beacon detector, IEEE 802.22 WRAN, IEEE 802.22.1 Sync Burst, IEEE 802.22.1 PPDU, television channels, e.g., ATSC, NTSC, and DVB-T.

The WRAN synchronization demodulator decoder 118 allows the system to receive outside data from another system, e.g., other BSs and CPEs not subscribed, while transmission/reception on another directional antenna can take place to a BS to which the CPE has subscribed. More specifically, the receiver can listen to other WRAN 802.22 systems. For example, there may be a coexistence beacon protocol (CBP) that requires one WRAN's CPEs to listen to and report information from a neighboring WRAN's BS and CPEs. Therefore, in embodiments of the invention, there are two receive paths and at least two turners, so that the reception of CBP frames from neighboring WRANs can be received while normal transmission/reception on the directional antenna can take place.

Figure 2:
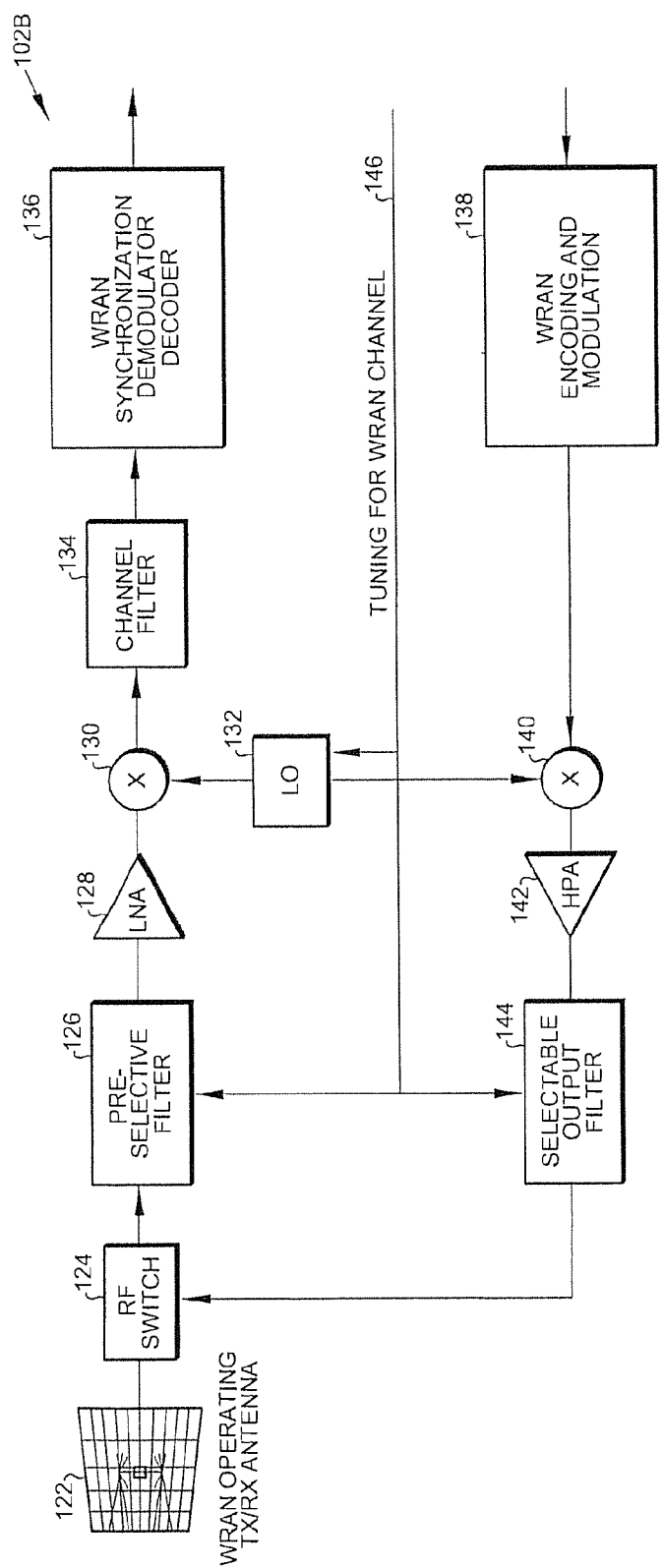
FIG. 2 is another simplified block diagram of a WRAN CPE RF architecture according to one embodiment of the invention.

Referring now to FIG. 2, in some embodiments, the WRAN signal receiving circuit 102b includes, for example, a demodulation circuit and a modulation circuit. The demodulation circuit may include a directional WRAN operating transceiver (TX/RX) antenna 122. The WRAN operating transceiver antenna 122 is coupled to a RF switch 124, which in turn is coupled to a pre-selective filter 126. The pre-selective filter 126 is coupled to a LNA 128, which in turn is coupled to a mixer 130. The mixer 130 is coupled to a LO 132 and a channel filter 134. The channel filter 134 is coupled to a WRAN synchronization demodulator decoder 136.

The modulation circuit of the WRAN signal receiving circuit 102b could include a WRAN encoding and modulation block 138 coupled to a mixer 140. The mixer 140 is coupled to the LO 132 and a high power amplifier (HPA) 142. The HPA 142 is coupled to a selectable output filter 144, which in turn is coupled to the RF switch 124 described earlier. The WRAN signal receiving circuit 102b also includes a tuning signal 146 for tuning the WRAN channel.

Accordingly, the WRAN CPE RF architecture includes two receive chains with a directional antenna and an omni-directional antenna. The WRAN CPE RF architecture facilitates opportunistic out-of-band spectrum sensing and WRAN signal receiving that are performed in parallel with data transmission.

More specifically, in some embodiments, the WRAN CPE RF architecture allows off-channel spectrum detection, including spectrum sensing and receiving of signals from other licensed exempt systems (such as other WRAN signals), while the WRAN CPE is synchronized with its BS and receives data. In other words, the WRAN CPE RF architecture provides two independent tuning circuits.

In some embodiments, the WRAN CPE RF architecture allows off-channel spectrum detection while the WRAN CPE transmits if there is sufficient isolation between the two antennas. This may be unlikely at the CPE (although it need not be), and it could also be possible at the BS.

In some embodiments, the WRAN CPE RF architecture uses different sampling frequencies for the analog/digital (A/D) conversion on the operational path, and the spectrum detection path may need to be different.

The WRAN CPE RF architecture, in some embodiments provides an optimized RF path for WRAN operation and spectrum detection.

In some embodiments, the WRAN CPE RF architecture allows for independent tuning of the operation RF path and the spectrum detection path.

In addition, the WRAN CPE RF architecture provides separate WRAN demodulation and spectrum detection circuits.

In some embodiments, the WRAN CPE RF architecture allows for better optimization of the CPE RF characteristics and of the WRAN system operating characteristics (i.e., minimize quiet periods). In some embodiments, the WRAN CPE RF architecture also allows for consistent automatic gain control (AGC) tracking and synchronization/acquisition in both RF paths. Furthermore, embodiments of the invention may be capable of supporting several modes of transmission including, for example, the CBP.

Accordingly, embodiments of the invention may provide an additional demodulator so that the CPE can receive data along the WRAN signal receiving circuit 102b using a directional antenna (such as the WRAN operating transceiver antenna 122), which is tuned to the BS's channel. Thus, the out-of-band sensing circuit 102a is used to sense transmitters on other channels with the omni-directional antenna path (such as the WRAN signal receiving circuit 102b). If another WRAN system is detected, the WRAN CPE RF architecture can decode the other system's transmission. In one embodiment, there are therefore none of the impairments on the RF side (such as adjusting the automatic gain control, etc.) generally found in conventional systems and methods.

The WRAN CPE RF architecture thus may also allow the CPE to receive and decode (beyond just sensing) the CPE frames from neighboring systems, while the CPE can continue to communicate (i.e., receive and transmit) on the channel that its BS uses.

In some embodiments, various functions described above can be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure as defined by the following claims.

What is claimed is:

1. A method of operating a coordinated pair of circuits in a Customer Premise Equipment (CPE) in a Wireless Regional Area Network (WRAN) comprising:
providing an out-of-band sensing circuit comprising an omnidirectional sensing antenna, a first tunable pre-selective filter coupled to the omnidirectional sensing antenna, a first low noise amplifier coupled to the first tunable pre-selective filter, a first mixer coupled to the first low noise amplifier, a first tunable local oscillator coupled to the first mixer, a first channel filter coupled to the first mixer, a first WRAN synchronization demodulator module coupled to the first channel filter, and a sensing scheme module coupled to the first channel filter;
operating the first tunable pre-selective filter and the first tunable local oscillator to receive a first common tuning signal;
operating the first WRAN synchronization demodulator module to ignore in-band signals but to detect other, out-of-band, WRAN signals, either from other WRAN base stations, television channels, or from other Customer Premise Equipment;
providing a transmitting and receiving circuit comprising a directional antenna operable both to transmit and receive, a radio frequency (RF) switch coupled to the directional antenna, an in-band demodulation circuit coupled to the RF switch, and an in-band modulation circuit coupled to the RF switch; and
operating the out-of-band sensing circuit at a same time that transmission and reception occurs on the transmitting and receiving circuit between the CPE and a base station to which the CPE is subscribed.

2. A method of operating a Wireless Regional Area Network (WRAN) Customer Premise Equipment (CPE) radio frequency (RF) system, comprising:
providing an out-of-band sensing circuit capable of out-band spectrum sensing comprising an omnidirectional sensing antenna; a first tunable pre-selective filter coupled to the omnidirectional sensing antenna, a first low noise amplifier coupled to the first tunable pre-selective filter, a first mixer coupled to the first low noise amplifier, a first tunable local oscillator coupled to the first mixer, a first channel filter coupled to the first mixer, a first WRAN synchronization demodulator module coupled to the first channel filter, and a sensing scheme module coupled to the first channel filter;
operating the first tunable pre-selective filter and the first tunable local oscillator to receive a first common tuning signal;
operating the first WRAN synchronization demodulator module to ignore in-band signals but to detect other, out-of-band, WRAN signals, either from other WRAN base stations, television channels, or from other Customer Premise Equipment;
providing an in-band WRAN signal transmitting and receiving circuit comprising a directional antenna operable both to transmit and receive, an RF switch coupled to the directional antenna, an in-band demodulation circuit coupled to the RF switch, an in-band modulation circuit coupled to the RF switch; and
operating the out-of-band sensing circuit and the transmitting and receiving circuits to perform, respectively, in parallel, out-band WRAN signal receiving on the omnidirectional antenna, and data transmission and reception on the directional antenna.

* * * * *